United States Patent
Lane et al.

(10) Patent No.: US 8,667,155 B2
(45) Date of Patent: Mar. 4, 2014

(54) SYSTEM AND METHOD FOR LINE RATE FRAME PROCESSING ENGINE USING A GENERIC INSTRUCTION SET

(75) Inventors: Douglas Lane, McKinney, TX (US); Wayne Sankey, Plano, TX (US); Ralf Woehler, Dallas, TX (US)

(73) Assignee: Adva AG Optical Networking, Munich (DE)

( * ) Notice: Subject to any disclaimer, the term of this patent is extended or adjusted under 35 U.S.C. 154(b) by 1277 days.

(21) Appl. No.: 12/041,452

(22) Filed: Mar. 3, 2008

(65) Prior Publication Data

US 2008/0215853 A1 Sep. 4, 2008

Related U.S. Application Data

(60) Provisional application No. 60/892,576, filed on Mar. 2, 2007.

(51) Int. Cl.
G06F 15/16 (2006.01)
G06F 15/173 (2006.01)
H04L 12/28 (2006.01)

(52) U.S. Cl.
USPC ............ 709/230; 709/226; 370/395.21

(58) Field of Classification Search
USPC ............................................ 709/230
See application file for complete search history.

(56) References Cited

U.S. PATENT DOCUMENTS

| | | | |
|---|---|---|---|
| 5,946,679 A | 8/1999 | Ahuja et al. | |
| 6,011,798 A | 1/2000 | McAlpine | |
| 6,560,230 B1 | 5/2003 | Li et al. | |
| 6,771,653 B1 | 8/2004 | Le Pennec et al. | |
| 6,791,990 B1 | 9/2004 | Collins et al. | |
| 6,901,050 B1 | 5/2005 | Acharya | |
| 6,925,055 B1 | 8/2005 | Erimli et al. | |
| 6,944,172 B2 | 9/2005 | Sankey et al. | |
| 7,006,440 B2 | 2/2006 | Agrawal et al. | |
| 7,007,151 B1 * | 2/2006 | Ely et al. | 711/202 |
| 7,447,212 B2 | 11/2008 | Hu | |
| 2002/0038379 A1 * | 3/2002 | Sato et al. | 709/238 |
| 2003/0076849 A1 * | 4/2003 | Morgan et al. | 370/412 |
| 2006/0187949 A1 | 8/2006 | Seshan et al. | |
| 2006/0187965 A1 | 8/2006 | Lee et al. | |
| 2007/0195793 A1 | 8/2007 | Grisser et al. | |
| 2007/0299987 A1 | 12/2007 | Parker et al. | |

* cited by examiner

Primary Examiner — Noel Beharry
(74) Attorney, Agent, or Firm — Haynes and Boone, LLP

(57) ABSTRACT

A system comprises a frame parser and lookup engine operable to receive an incoming data frame, extract control data from payload data in the data frame, and using the control data to access a memory to fetch a plurality of instructions, a destination and tag management module operable to receive the fetched instructions and execute the instructions to transform the data frame control data, and an assemble module operable to assemble the transformed control data and the payload data.

19 Claims, 4 Drawing Sheets

SYSTEM AND METHOD FOR LINE RATE FRAME PROCESSING ENGINE USING A GENERIC INSTRUCTION SET

RELATED APPLICATIONS

This application claims the benefit of U.S. Provisional Patent Application Ser. No. 60/892,576, filed on Mar. 2, 2007.

This application is related to U.S. patent application Ser. No. 11/681,606 filed on Mar. 2, 2007, and entitled "System and Method for Aggregated Shaping of Multiple Prioritized Classes of Service Flows," U.S. patent application Ser. No. 11/681,647 filed on Mar. 2, 2007, and entitled "System and Method For Constrained Machine Address Learning," and Ser. No. 12/041,476 filed on Mar. 3, 2008, and entitled "System and Method of Defense Against Denial of Service Attacks." These applications are hereby incorporated by reference in their entirety.

BACKGROUND

Data packets within a network equipment must be identified to a service and transformed appropriately for proper transmission across a network or to a client. This transformation includes control plane information appended to the packet data used within the network equipment and also frame header information of the packet itself (i.e., MAC address, VLAN tags, etc.) used throughout the network. This processing occurs on every packet, and therefore must occur at line rate to ensure no packet loss due to any processing buffer overflow.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
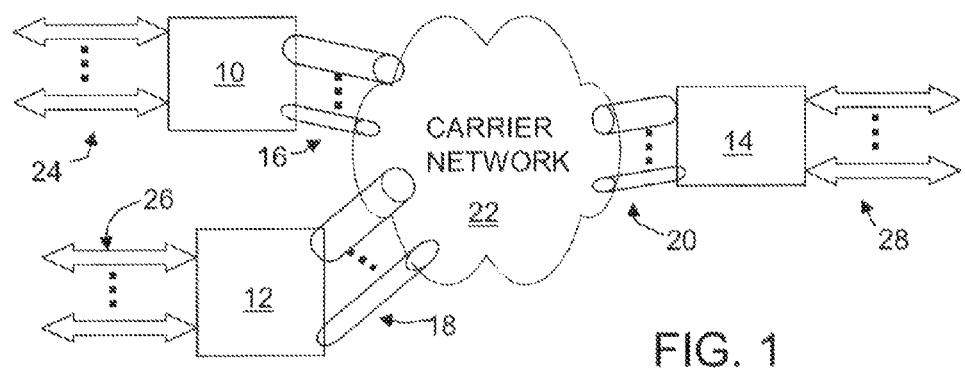
FIG. 1 is a simplified block diagram of a plurality of access gateways to local area networks each having a plurality of Ethernet virtual circuits of various bandwidths transmitting and receiving data packets over a carrier network.

FIG. 1 is a simplified block diagram of a plurality of network equipment 10-14, such as access gateways, coupled to local area networks (LANs) or virtual LANs (VLANs) and to Ethernet virtual circuits (EVCs) 16-20 of various bandwidths over a carrier network 22, such as a wide area network (WAN). network equipment 10-14 are operable to provide aggregated shaping of multiple prioritized classes of service (CoS) flows 24-28. Preferably, the access gateways support the IEEE 802.1ad, 802.1ag, 802.1D, 802.1Q, 802.3ah, and other applicable standards. Hereinafter, the terms local area network and LAN may be used to refer to a computer network that is more localized in nature to connect computers that are co-located or situated at one site. The terms wide area network and WAN may be used to refer to a computer network that spans a large geographical area, and may comprise two or more local area networks.

Figure 2:
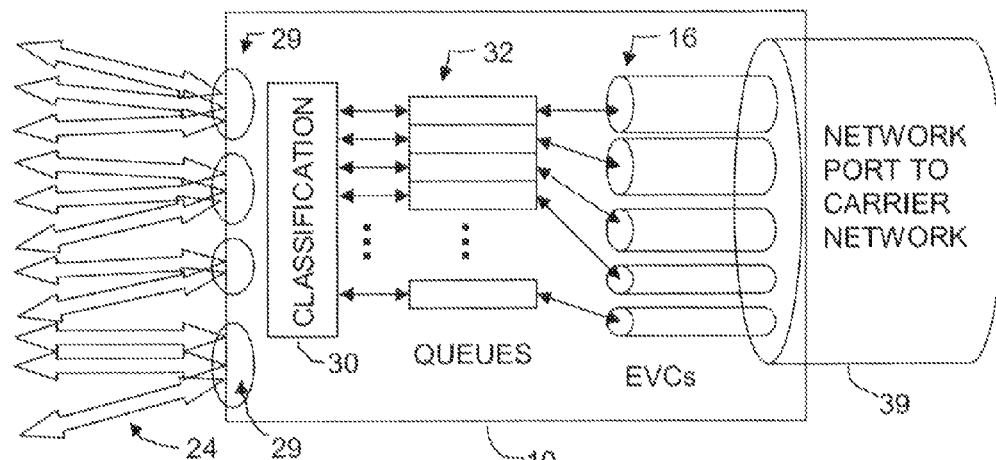
FIG. 2 is a simplified block diagram of an embodiment of an access gateway operable to provide aggregated shaping of multiple prioritized classes of service flows.

FIG. 2 is a simplified block diagram of an embodiment of a network equipment or an access gateway 10. Access gateway 10 is coupled to a plurality of customer ports 29 to receive and transmit a plurality of service flows 24. The traffic in the service flows may include VoIP, video, and data traffic that have different bandwidth, latency and jitter requirements. A customer Ethernet virtual circuit (EVC) connection is identified by a unique X-tag at a customer port 29. The data frames in the service flows 24 arriving on the customer ports 29 are sorted and classified by a classification module 30 and forwarded in CoS flows to other processing modules, including a plurality of queues 32 that perform buffering and shaping. The queues are further grouped and prioritized to form QoS queues to enable aggregated scheduling of the grouped queues subject to one another. As a result, groups of queues 32 related by network port EVC or output LAN port are scheduled subject to each other. The groups have strict priority for determining frame egress ordering subject to the availability of tokens. Data packets are removed from the queues 32 (dequeued) and transmitted over a plurality of Ethernet virtual circuits 16 out to the carrier network 22 via a network port 39 according to certain parameters of the service flows, such as committed information rate (CIR) and excess information rate (EIR), and the CoS for the queue. This aspect is described in more detail below. The Ethernet virtual circuits at the network port 39 is identified by a unique S and C tag combination. Any queue may be mapped to any output port and the frames from any input port may be entered into any queue.

In previous implementations of frame processing engines, hard coded, highly specific functions are provided in discrete entities or modules in hardware to handle each individual frame transformation. What is described herein is a method of using a uniquely defined set of instructions to create programs of ordered operations to be executed on packet data. These programs can modify the frame header information as well as the internal proprietary control information appended to the frame by network equipment. The program selection as well as the execution is dependent on properties of the frame itself.

Figure 3:
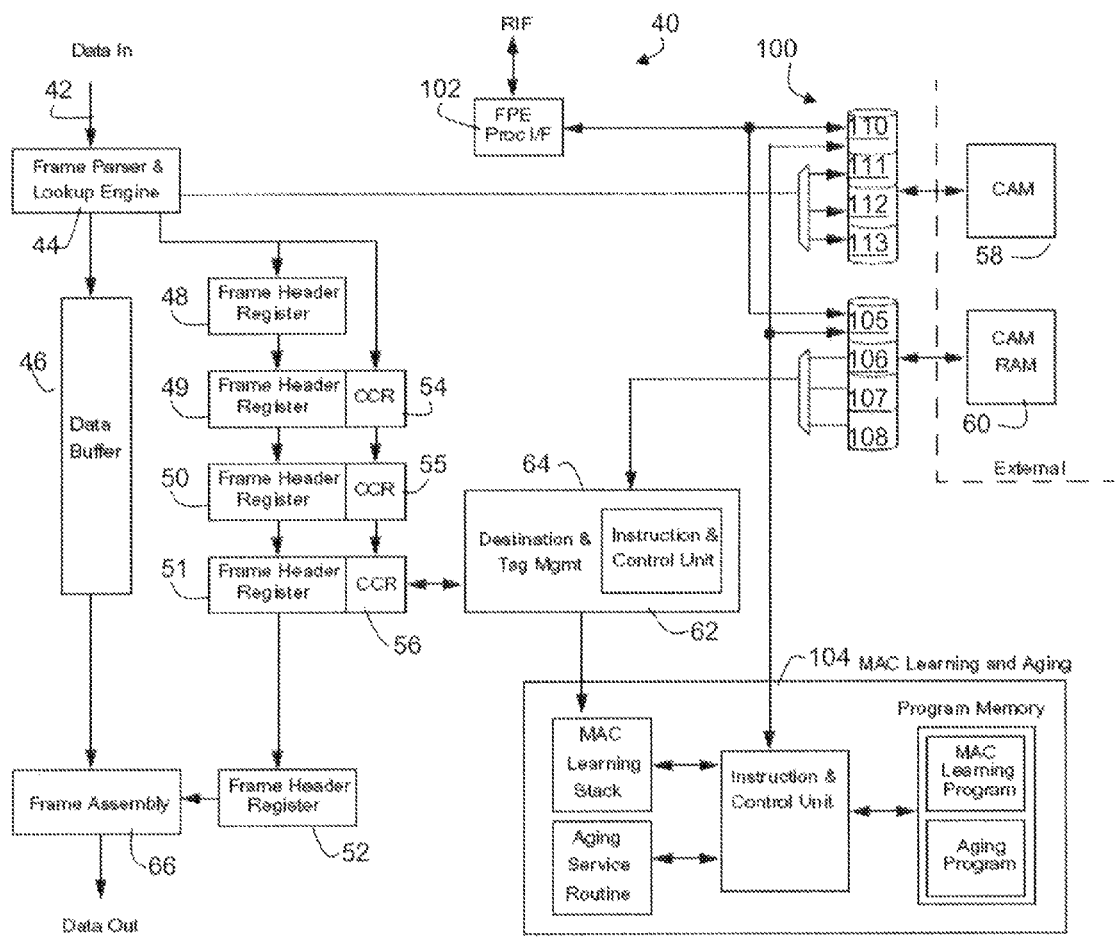
FIG. 3 is a simplified block diagram of an embodiment of a frame processing engine.

FIG. 3 is a simplified block diagram of an embodiment of a frame processing engine 40. Incoming data 42 is first received by a frame parser and lookup engine 44. The data frame is parsed to extract and separate the control data in the frame header from the payload data. The payload data is stored in a data buffer 46, and the control data and header data are stored in the frame header registers 48-52. In the embodiment shown in FIG. 3, five frame header registers 48-52 are used to process five frames simultaneously. The condition code registers (CCR) 54-56 are used to store flags and status bits of the logical instructions being executed. The contents of the condition code registers are moved along with the frame header register contents. Further, the MAC address, VLAN tags, and port information are used to access a content addressable memory (CAM) 58 and a CAM RAM 60. The extracted frame control information is used in conjunction with the CAM 58 and CAM RAM 60 to both retrieve and execute the proper program for that frame. The CAM 58 and CAM RAM 60 are external to the frame processing engine 40, which may be implemented by one or more field programmable gate arrays (FPGAs).

Once the CAM search requests have been made, the content of the first frame header register 48 is copied to the second frame header register 49. Once the results from the CAM and CAM RAM lookup are stored, the content of the second frame header register 55 is copied into the third frame header register 56. The content of the third frame header register 50 is copied into the fourth frame header register 51 when the EVC subroutine returned from the CAM and CAM RAM lookup is executed in an instruction & control unit 62. The instruction & control unit 62 is used to fetch, decode and execute the program instruction s from the CAM RAM. A destination and tag management module 64 uses the contents of the fourth frame header register 51 to modify the frame control information based on the CAM and CAM RAM lookup results. More specifically, the destination and tag management module uses the CAM search results to insert destination information and modify the VLAN tags. The values of the condition code registers can be examined by the destination and tag management module 64 for conditional logic. The content of the fourth frame header register 51 is copied into the fifth frame header register 52 so that the frame control information may be reassembled with the payload data in a frame assembly module 66.

Figure 4:
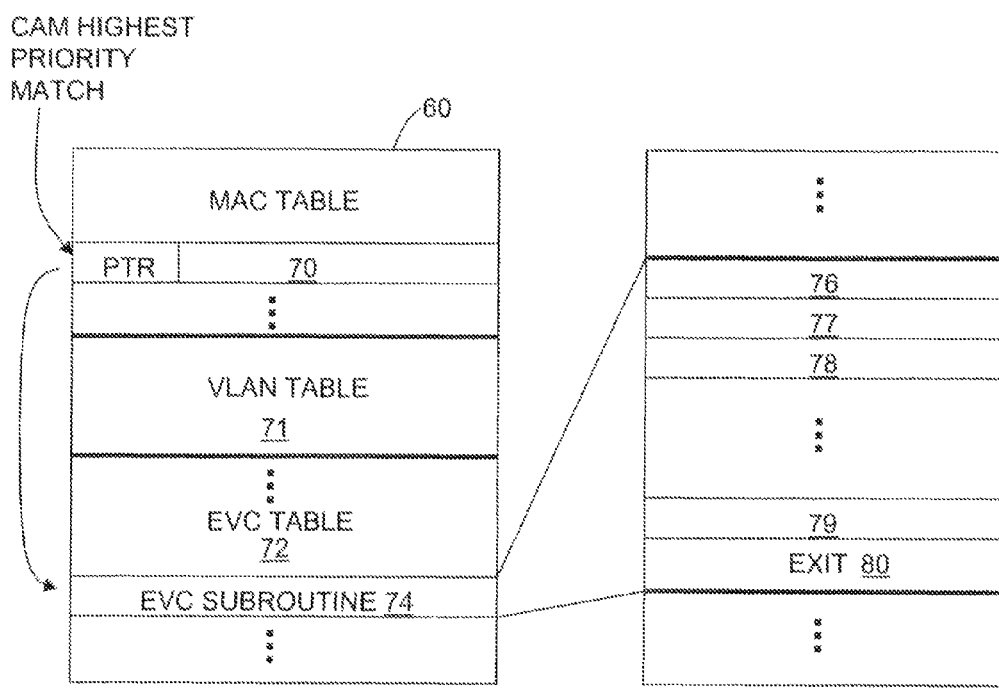
FIG. 4 is a simplified diagram illustrating an embodiment of a content addressable memory for accessing EVC subroutines.

Referring also to FIG. 4, a CAM search using the MAC address and/or VLAN tags and/or port ID in the data frame control data returns a pointer/address 70 into the CAM RAM 60. Multiple CAM lookup requests may be made on each frame. For example, the MAC destination address may be used to look up the MAC destination address in the MAC learning table, the MAC source address may be used to look up the MAC source address (for MAC-to-tag association) in the MAC learning table, and the value of one or more control data fields may be used to look up the VLAN tag in the VLAN table. In the example shown in FIG. 4, the EVC pointer 70 in the CAM RAM points to a location in the EVC table 72 that stores an EVC subroutine 74 having a plurality of instructions 76-80. Multiple CAM locations can point to the same EVC subroutine. Once the program instructions are retrieved and cached, an instruction and control unit in the destination and tag management module interprets and decodes each instruction for execution in order until an 'EXIT' instruction 80. Because of conditional instructions (e.g., jump_if_equal), the same program can follow a different instruction path based upon the parsed properties of the data frame. Once execution is complete, the modified frame control information is reassembled with the data payload in the frame assembly module 66, and the assembled frame is forwarded downstream.

Figure 5:
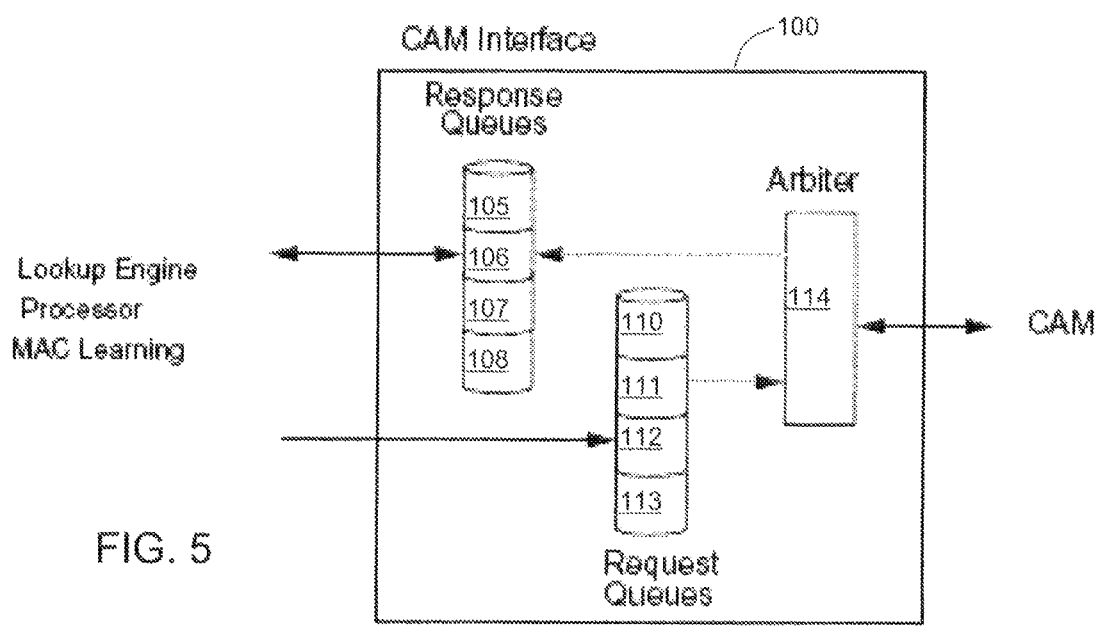
FIG. 5 is a simplified block diagram of an embodiment of a CAM interface module.

FIG. 5 is a simplified diagram for a CAM interface module 100, which is also shown in FIG. 3. The CAM interface module 100 arbitrates CAM accesses from the lookup engine 44, a processor 102, and a MAC learning and aging module 104. In the embodiment shown in FIGS. 3 and 5, four CAM request queues 110-113 are used to hold CAM access requests until the CAM request bus is available. In the embodiment shown in FIG. 3, three request queues 111-113 hold search requests from the frame parser and lookup engine 44, and the fourth request queue 110 is shared by the processor 102, the MAC learning and aging process 104. In this embodiment, there are also four CAM result queues 105-108. These queues 105-108 store the CAM request results until the requesting module is ready to decipher the response. The result queues 106-108 are used to store the search results for the frame parser and lookup engine 44, and the fourth result queue 105 stores the read back data of the processor's read requests. A CAM arbiter 114 controls the physical interface of the CAM and arbitrates CAM access requests between the four CAM request queues 110-113. The CAM arbiter 114 also stores the CAM responses in the appropriate result queue 105-108.

The purpose of the frame processing engine is to provide a highly flexible and generic solution to both transform and direct data packets through a network equipment. This is accomplished through programs composed from a generic instruction set. The program executed and thus the processing of the frame is based upon the properties of the frame itself and is achieved at the line rate of the data. There are several advantages to this method of frame processing.

The frame processing engine described herein is highly flexible. A multitude of different transformations can be defined with a single set of instructions. Both the specific instructions used and the order in which they are executed can define different transformations. Because of conditional instructions, even the same frame processing engine program can perform different transformations based upon properties (or conditions) of the frame. Additional future requirements can also be met with the existing instruction set. By simply updating an existing program or creating a new program, new functions can be achieved. This requires only a software change, and there is no need of an FPGA update.

The frame processing engine is also very adaptable. If future requirements did demand additional instructions, the overall architecture of the frame processing engine is very accommodating. There would be no need for an architecture change, only the additional decode logic to accommodate the new instruction(s). Therefore, future requirements can be achieved by a program with the already defined instruction set (software change only), or they can be achieved through additions to the instruction set. The latter may require an FPGA update, but not any architectural changes.

The frame processing engine process is accomplished at line rate. The programs are stored and fetched from an external SRAM and executed within the FPGA. Retrieval and execution of the programs are performed at the data clock rate. Neither the control information or the packet data itself is sent to an external processing device.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A system comprising:
a memory including a content addressable memory (CAM) having a first pointer pointing to a location in a CAM RAM containing a second pointer pointing to a location in the CAM RAM storing a plurality of instructions, the memory operable to identify the first pointer based on control data derived from a data frame being processed by the system; and
a frame processing engine having:
a frame parser and lookup engine in communication with the memory and operable to receive an incoming data frame, extract control data from payload data in the data flame, store the payload data, and access the memory to fetch the plurality of instructions in response to the control data of the data frame;

a first frame header register in communication with the frame parser and lookup engine, the first frame header register operable to receive and temporarily store the extracted control data from the frame parser and lookup engine;

a destination and tag management module in communication with the memory and the first frame header register, the destination and tag management module operable to receive the fetched instructions and execute the instructions to transform the data frame control data temporarily stored in the first frame header, wherein executing the instructions transforms the control data by inserting destination information and modifying tag data;

wherein the fetched plurality of instructions has an order of execution that includes at least one conditional instruction that is non-executed because of a property of the control data during transforming the control data;

a second frame header register in communication with the first frame header register, the second frame header register operable to receive and temporarily store the transformed control data; and an assemble module operable to receive the payload data from the frame parser and lookup engine, and the transformed control data received from the second frame header register, and assemble the transformed control data and the payload data.

2. The system of claim 1, further comprising a second incoming data frame wherein the first frame header register is temporarily storing the extracted data from the incoming data frame and the second frame header register is temporally storing extracted data from the second incoming data such that the system processes at least two data frames simultaneously.

3. The system of claim 1, further comprising at least one condition code register operable to temporarily store at least one set of flags and status bits of the instructions being executed.

4. The system of claim 1, further comprising a memory interface module operable to arbitrate access to the memory from a plurality of sources, including the frame parser and lookup engine.

5. The system of claim 4, wherein the memory interface module comprises at least one request queue operable to temporarily store memory access requests from the frame parser and lookup engine.

6. The system of claim 4, wherein the memory interface module comprises at least one response queue operable to temporarily store memory access results from the memory.

7. The system of claim 1, wherein the frame parser and lookup engine makes multiple memory accesses for each data frame.

8. The system of claim 1, further comprising a data buffer coupled to the frame parser and lookup engine and operable to temporarily store the payload data while the control data is being transformed.

9. The system of claim 1, wherein modifying tag data includes modifying VLAN tag data.

10. A method comprising:
receiving a data frame at a frame parser and lookup engine;
extracting control data from payload data in the data frame by the frame parser and lookup engine;
storing the payload data in the frame parser and lookup engine;
sending the extracted control data to a first frame header register and temporarily storing the extracted control data therein;
accessing a memory, by the frame parser and lookup engine, using the extracted control data and fetching a plurality of instructions;
receiving the plurality of instructions at a destination and tag management module in communication with the memory;
executing, by the destination and tag management module, the fetched plurality of instructions and transforming the control data temporarily stored in the first frame header by inserting destination information and modifying tag data in response to the executed plurality of instructions;
wherein the fetched plurality of instructions has an order of execution that includes at least one conditional instruction that is non-executed because of a property of the control data during transforming the control data;
receiving at a second frame header register the transformed control data and temporarily storing the transformed control data therein; and
assemble, by an assemble module, the transformed control data received from the second frame header register with the payload data received from the frame parser and lookup.

11. The method of claim 10, wherein accessing the memory comprises:
looking for a match in a content addressable memory (CAM) with the extracted control data;
accessing a first pointer in the CAM in response to a match;
accessing a second pointer in a CAM RAM in response to the first pointer; and
accessing a plurality of instructions in the CAM RAM in response to the second pointer.

12. The method of claim 10, wherein accessing the memory comprises:
looking for a match in a first memory with the control data;
accessing a first pointer in the first memory in response to a match;
accessing a second pointer in a second memory in response to the first pointer; and
accessing a plurality of instructions in the second memory in response to the second pointer.

13. The method of claim 10, further comprising:
receiving a second incoming data frame;
extracting control data from payload data in the second data frame by the frame parser and lookup engine; and
sending the extracted control data to the first frame header register and temporarily storing the extracted control data therein while the second frame header register is temporarily storing the extracted data from the incoming data frame.

14. The method of claim 10, further comprising temporarily storing at least one set of flags and status bits of the plurality of instructions being executed.

15. The method of claim 10, further comprising arbitrating access to the memory from a plurality of sources.

16. The method of claim 15, further comprising temporarily storing memory access requests.

17. The method of claim 15, further comprising temporarily storing memory access results from the memory.

18. The method of claim 10, wherein accessing the memory comprises making multiple memory accesses for each data frame.

19. The method of claim 13, further comprising temporarily storing the payload data of the second data frame while the control data is being transformed.

* * * * *